Jan. 21, 1958
E. R. WILSON
2,820,442
VALVE SPRING RETAINER OIL SEAL
Filed May 23, 1952
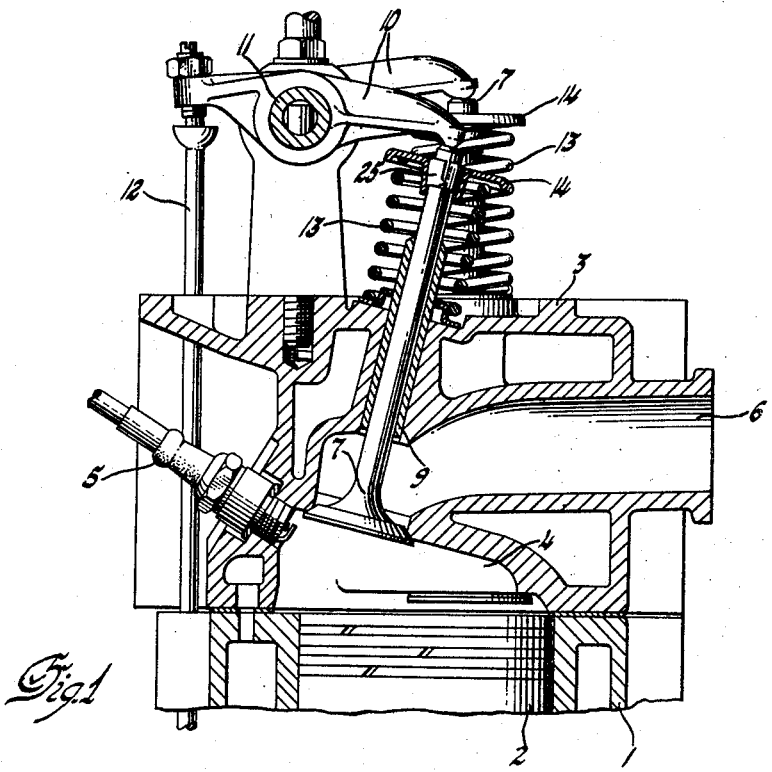
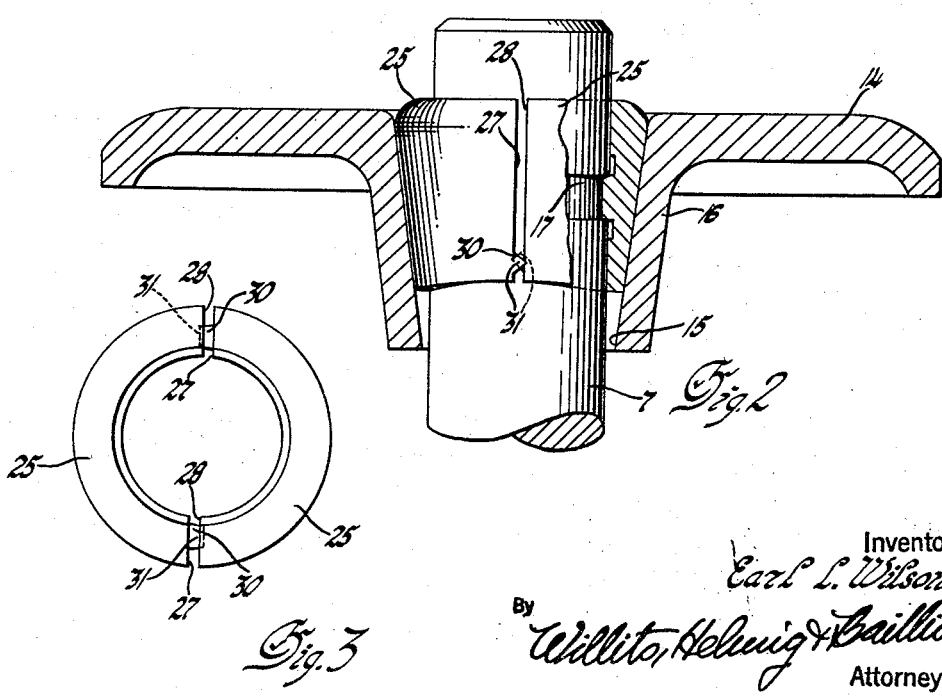
Inventor
Earl R. Wilson
By Willito, Helwig & Baillio
Attorneys United States Patent Office 2,820,442
Patented Jan. 21, 1958

2,820,442

VALVE SPRING RETAINER OIL SEAL

Earl R. Wilson, Flint, Mich., assignor to General Motors Corporation, Detroit, Mich., a corporation of Delaware Application May 23, 1952, Serial No. 289,518

8 Claims. (Cl. 123—90)

This invention relates to internal combustion engines and particularly to poppet valve spring retaining means for use in such engines.

The valve springs are conventionally anchored to the valve stems by washers having two or more split segmental locks or keys which interengage the valve stem and wedge themselves between the stem and the opening in the washer. Such keys, of necessity, have a certain amount of circumferential spacing betwen their opposing edge faces in order to facilitate assembly and removal from the stem and to accommodate manufacturing tolerances in the parts of the assembly. The stems of the valves are guided in the cylinder head of the engine for reciprocation by rocker arms and are normally supplied with lubricating oil used in lubricating the shafts supporting the rocker arms, which oil tends to flow down the valve stems between the segmental keys and is wasted by being burned in the engine combustion chamber. A small amount of oil, however, is desired to pass the keys in order to lubricate the valves in their guides.

Numerous previous attempts have been made to control this leakage of oil down the valve stems, but have not been entirely successful, either because they added materially to the weight of the reciprocating parts or to the costs of manufacture, or completely prevented all flow of oil down the stems with resultant loss of lubrication of the stems in their guides.

It is the object of the present invention to provide an improved means for restricting such oil leakage, which overcomes the aforementioned objections. I accomplish this by providing the opposing faces of the keys with a projection or boss adapted to abut and at least partially block the flow of oil between such faces.

In the drawing,

Figure 1 shows a transverse section through an internal combustion engine fitted with valves incorporating my improved valve spring washer oil seal.

Figure 2 is an enlarged view similar to Figure 1, showing the parts forming my improved seat in greater detail.

Figure 3 is a plan view of the keys removed from the assembly.

Referring to the drawing in detail, the engine indicated in Figure 1 includes a cylinder block 1 formed with a cylinder fitted with a piston 2 and closed at its upper end by a cylinder head 3 to provide a combustion chamber 4. At 5 is shown the usual spark plug for igniting the fuel charge in the combustion chamber from which passages 6 extend for introducing and discharging the products of combustion. Controlling the passages are valves whose stems 7 are slidably guided for generally vertical reciprocation in guides 9 fitted in the head 3. The valves are operated by valve rockers 10 mounted for oscillation on a shaft 11 and having arms engaging the upper ends of the valve stems and push rods 12. Valve springs 13 resting on the head embrace the valve stems and have their upper ends in abutment with valve spring retainer washers 14.

As best shown in Figure 2, the retainer washer 14 has an opening 15 through which the valve stem extends, and this opening is defined by a downwardly turned flange 16 which tapers inwardly toward the stem from its upper end. The valve stem 7 extends through this opening and is provided with a peripheral groove 17. Embracing the stem and engaging this groove are a plurality of segmental locks or keys 25. Each of these keys is preferably of identical configuration and each is wedge-shaped in radial section to provide a firm abutment for the valve spring washer 14. The circumferentially opposite ends of each key are formed with faces 27 and 28 which are in spaced-apart relation with the corresponding faces of each adjacent key of the assembly.

Some of the engine lubricating oil, which may be conducted through the hollow rocker shaft (or other suitable means) for lubricating the rocker shaft 11 and the upper ends of the valve stem 7 and push rod 12, tends to drain down the valve stem into the combustion chamber 4 which is objectionable in that it increases the engine oil consumption and results in exhaust smoking. A certain amount of oil flow down the valve stem, however, is desirable and usually necessary to provide for lubrication of the stem in its guide bushing 9. My invention, which affords the necessary restriction to this oil flow, without materially adding to the costs of the parts or their reciprocating inertia, will now be described.

The face 27 of each key is provided with a projecting portion or boss 30 which terminates in a V-shaped edge 31 extending transversely of the longitudinal axis of the key. This boss 30 is of sufficient dimension transversely and circumferentially of the axis of the key that it substantially blocks the channel formed between the opposing key faces 27 and 28, the periphery of the valve stem and radially inward face of the washer flange 16. Preferably the edge 31 is made relatively sharp and projects a sufficient distance from the face 27 to abut and partially interfere with the opposing face 28 of the adjacent key, whereby a positive abutment with the face 28 is assured, the necessary interference being accommodated by the sharp edge being blunted a certain amount as well as imbedding itself into the opposite face 28, during installation and use.

In accordance with conventional practice, while the valve stems are accurately finished to a uniform diameter as by centerless grinding, the inner and outer peripheries of the keys and the surface of the tapered opening 15 in the washer are formed by stamping or cold forging. As a result, a uniformly close fit between these parts does not normally occur, especially at the time of initial assembly, and minute local clearances exist between their opposing surfaces which permit a small flow or seepage of oil to pass through the washer and along the stem. After a period of use, i. e. engine operation, however, these surfaces become more closely mated and deposits of oil sludge and/or varnish accumulate to close up their localized clearance spaces, thereby reducing the initial rate of oil passage between them. This development is also desirable since the valve stems and guides require less oil for lubrication after their "run-in" period.

The addition of the boss 30, arranged to abut the opposing edge face 28 of the adjacent key and at least substantially seal off the flow of oil in the manner described, thus enables restricting the oil leakage down the stem to the amount necessary for valve stem lubrication. Further, the provision of the sharp edge 31 on this boss eliminates the necessity for maintaining close manufacturing tolerances on the thickness and arcuate length of the keys, and the size of the boss.

While a specific form for this boss 30 has been shown and described, it is appreciated that minor modifications thereof may be made without departing from the scope and spirit of my invention, as will now be claimed.

I claim:

1. In an internal combustion engine having a poppet valve with a generally vertically guided stem, valve operating means including a return spring, retaining means for said spring at the upper end of the valve stem, said retaining means including a washer member having an opening substantially larger than the stem and a plurality of segmental keys disposed within said opening and closely embracing the stem, said keys having at least two of their oppositely disposed end faces in spaced apart relation, one of said end faces being provided with a projection extending toward the oppositely disposed end face of the adjacent key for at least partially blocking the passage of lubricant through said opening, said oppositely disposed end face of the adjacent key being substantially flat and extending uninterruptedly the full length and thickness of the key.

2. In combination with a poppet valve having a stem and a valve return spring, retaining means on the stem for said spring including a member surrounding the stem and forming a spring seat, said member having its inner periphery defined by a flange facing and spaced from the outer periphery of the stem, and a plurality of segmental keys substantially but not completely filling the space between said flange and the stem, said keys having their oppositely facing ends in spaced apart relation and defining channels for the passage of lubricant longitudinally of and between the stem and said flange, each of said keys having one of its said ends provided with a portion projecting into said channel and restricting the passage of lubricant therethrough, the oppositely facing end of the adjacent key being substantially flat and extending uninterruptedly the full length and thickness of the key.

3. In an arcuate shaped key adapted to cooperate with another key of like form in providing a segmental annular locking and bushing means between a poppet valve stem and its valve spring retaining washer, said key having circumferentially opposite end faces each forming one wall of a channel accommodating the passage of lubricant between adjacent keys, said key having one of its circumferentially opposite ends formed with a portion extending circumferentially beyond its said end face and adapted to abut the oppositely disposed face of the adjacent key, the other circumferentially opposite end of said key having a substantially flat face extending uninterruptedly the full length and thickness of said key.

4. A valve spring retainer key adapted to cooperate with another key of like form in restricting the flow of lubricant along a valve stem, said key being of arcuate segmental shape and having circumferentially opposite end faces, one of said faces having a V-shaped boss projecting therefrom and adapted to abut the other face of said cooperating key, said boss having its length parallel to the crest of the "V" disposed transversely of the longitudinal axis of the key.

5. In a key adapted to cooperate with another key of like form in providing a segmental annular abutment for a valve spring retainer washer on its valve stem, the opposing edge faces of which key segments are in spaced apart relation, the improvement consisting of providing one of said faces of the key with a V-section boss extending transversely of the longitudinal axis of the key, said boss terminating circumferentially of the key in a sharp edge disposed at a greater distance from the surface of said one face than the normal spacing of said one face from the opposing face of the adjacent key, thereby insuring interference between said sharp edge and the opposing face of the adjacent key upon assembly therewith.

6. The combination set forth in claim 2, wherein said portion is in the form of a V-shaped boss terminating circumferentially of the key in a sharp edge abutting the oppositely facing end of the adjacent key.

7. The combination set forth in claim 2, wherein said portion is in the form of a V-shaped boss having its length parallel to the crest of the V disposed transversely of the longitudial axis of the key.

8. In combination with a poppet valve having a stem and a valve return spring, retaining means including a washer member having an opening substantially larger than said stem and a plurality of segmental keys disposed within said opening and closely embracing said stem, said keys having oppositely disposed end faces forming a channel extending in the direction of the length of said stem, channel restricting means on one of said end faces, said restricting means extending into said channel and adapted to abut the oppositely disposed end face of the adjacent key to form a restriction in said channel, said restricting means consisting of a V-shaped boss formed as a projection on said one end face and terminating in a sharp edge extending generally transversely of said channel.

References Cited in the file of this patent

UNITED STATES PATENTS

| | | |
|---|---|---|
| 1,554,227 | Nickol | Sept. 22, 1925 |
| 1,761,925 | Lampman | June 3, 1930 |
| 2,419,708 | Cummings | Apr. 29, 1947 |